J. W. HALEY & C. B. YELTON.
REGISTER FOR LUMBER MEASUREMENTS.
APPLICATION FILED DEC. 22, 1909.

984,908.

Patented Feb. 21, 1911.

J. W. HALEY & C. B. YELTON.
REGISTER FOR LUMBER MEASUREMENTS.
APPLICATION FILED DEC. 22, 1909.

984,908.

Patented Feb. 21, 1911.

J. W. HALEY & C. B. YELTON.
REGISTER FOR LUMBER MEASUREMENTS.
APPLICATION FILED DEC. 22, 1909.

984,908.

Patented Feb. 21, 1911.

J. W. HALEY & C. B. YELTON.
REGISTER FOR LUMBER MEASUREMENTS.
APPLICATION FILED DEC. 22, 1909.

984,908.

Patented Feb. 21, 1911.

UNITED STATES PATENT OFFICE.

JOSEPH W. HALEY AND CHARLES B. YELTON, OF ERLANGER, KENTUCKY.

REGISTER FOR LUMBER MEASUREMENTS.

984,908. Specification of Letters Patent. Patented Feb. 21, 1911.

Application filed December 22, 1909. Serial No. 534,496.

*To all whom it may concern:*

Be it known that we, JOSEPH W. HALEY and CHARLES B. YELTON, citizens of the United States, residing at Erlanger, in the county of Kenton and State of Kentucky, have invented a new and useful Register for Lumber Measurements, of which the following is a specification.

This invention has reference to improvements in registers for lumber measurements and its object is to provide a register whereby both strip count and face count as applied to dressed and matched lumber are indicated and the number of board feet is shown.

In figuring and tallying lumber mistakes are very liable to occur and great caution is necessary to avoid mistakes since the wholesale trade recognizes strip count only in the measurement of dressed and matched lumber while the retail trade in many instances recognizes only face count. Hence the retail dealer buys ceiling, flooring and siding by strip count and sells to his customers by face count making it necessary for him to figure the difference between strip count and face count in arranging his profit as well as to figure the amount of feet contained in the length necessary to fill the order as called for. This means calculating by fractions which vary with different kinds of lumber and so the likelihood of mistakes is constantly present.

Lumber is made up into stock sizes of different lengths and widths and usually runs a certain number of pieces to a bunch, this applying to dressed and matched lumber and not to rough lumber. With a structure built in accordance with the present invention the operator to fill an order has but to move levers or like devices representing different widths and lengths of lumber until the total number of feet wanted is indicated on a totalizing index and then on other indices will be shown the number of bunches of lumber of different lengths and both the face and strip count will be shown. The operator then has but to select the indicated number of bunches of the indicated lengths to fill the order and may then readily calculate the price.

The invention will be best understood from a consideration of the following detail description taken in connection with the accompanying drawings forming a part of this specification, in which drawings.

Referring to the drawings there is shown a casing 1 having a cover portion 2 hinged to the main portion of the casing so that this cover may be moved about its hinges to expose the interior of the casing when desired. Within the casing near one side is a fixed partition 3 parallel with the sides of the casing and dividing the interior of the casing into two unequal chambers. Extending across the casing about midway of its length and journaled in one side of the casing and in the partition 3 is a shaft 4 and near one end of the casing is another shaft 5 parallel with the shaft 4 and journaled in similar manner thereto.

Mounted on the shaft 4 in spaced relation one to the other are grooved wheels or disks 6 and likewise mounted on the shaft 5 are similar grooved wheels or disks 7. The disks 6 are mounted to rotate with their respective shafts but each disk is capable of limited longitudinal movement on its shaft.

Figure 5:
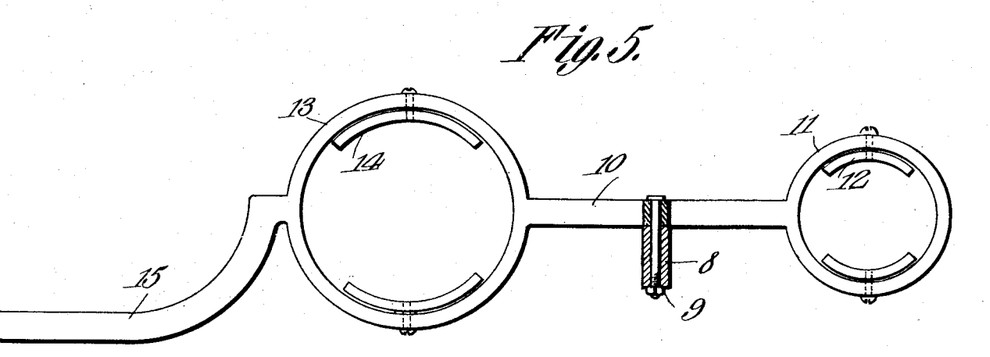
Fig. 5 is a detail view of one of the clutch operating structures.
Figure 6:
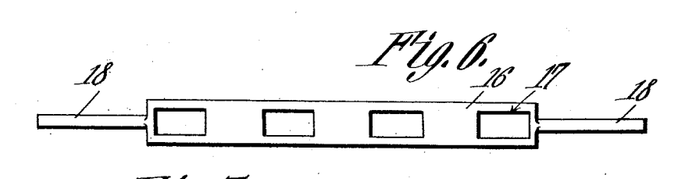
Fig. 6 is a detail view of a slide used in the structure.
Figure 7:
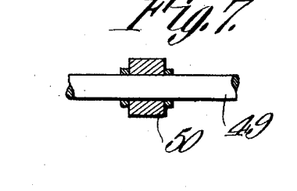
Fig. 7 is a detail section of a support for rollers used in the structure.
Figure 8:
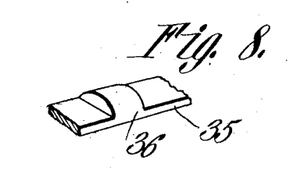
Fig. 8 is a detail perspective of a portion of a tape guide.
Figure 9:
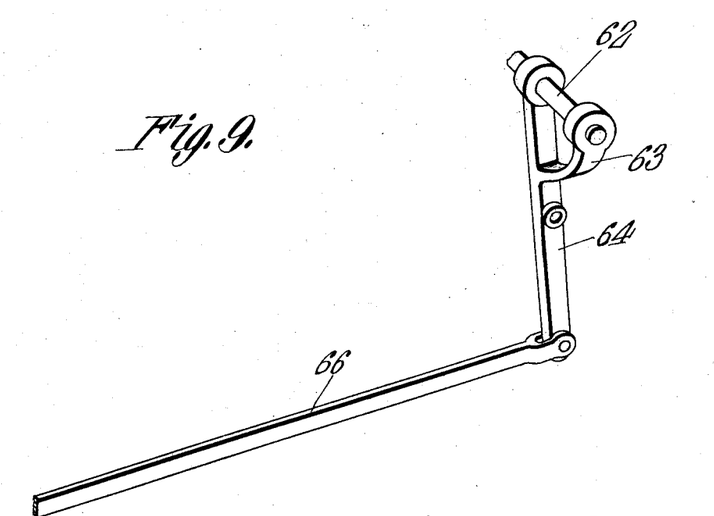
Fig. 9 is a perspective view of a mounting for a gear wheel used in the structure.
Figures 10, 11:
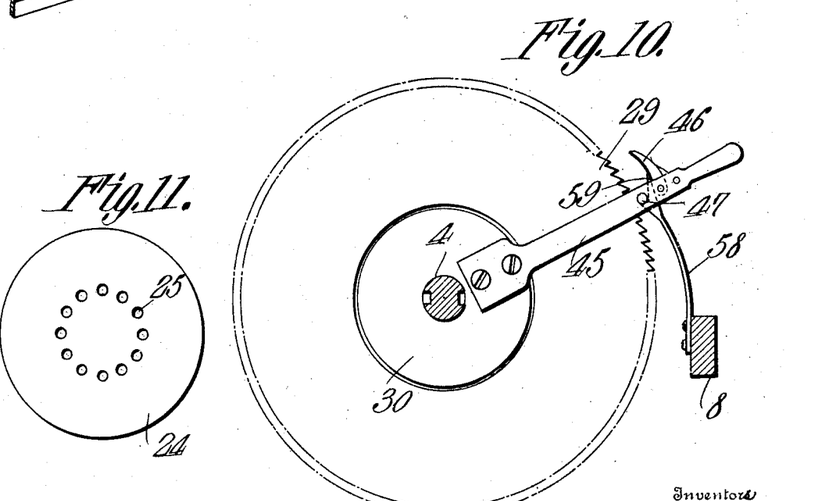
Figs. 10 and 11 are detail views showing parts of the setting mechanism.

Traversing the chamber containing the shafts 4 and 5 at a point between these shafts is a bar 8 carrying pivot pins 9. Mounted upon each pivot pin 9 is a lever 10 best shown in Fig. 5. One end of the lever terminates in a ring 11 surrounding a corresponding grooved wheel 7 and this ring carries diametrically opposed blocks 12 in pivotal relation to the ring 11 and entering the groove in the corresponding disk 7.

The longer arm of the lever is provided with a ring 13 surrounding a corresponding disk 6 and like the ring 11 provided with blocks 14 in pivotal relation to the ring and entering the groove in the corresponding disk 6. The lever 10 is continued beyond the ring 13, as shown at 15 and this extension is carried through the corresponding end of the casing 1 so as to be accessible from the exterior of the casing. Since there may be several disks 6 and 7 on the two shafts 4 and 5 and there is provided a lever 10 for each corresponding pair of disks 6 and 7 there are as many levers 10 as there are pairs of disks 6 and 7 on the two shafts 4 and 5.

It is sometimes desirable to operate the several levers simultaneously and for this purpose there is provided a slide 16 having elongated slots 17 appropriately located for the passage of the accessible ends of the levers 10 and this slide is provided at the ends with extensions 18 for supporting the slide and permitting a longitudinal movement thereof sufficient to engage and actuate all the extensions 15 simultaneously.

Each disk 6 and 7 is provided on one face with laterally projecting pins 19 and these pins are each preferably mounted on one end of a leaf spring 20 within the disk 6 or 7 which latter may be of hollow construction being composed of two plates 21 in parallel relation and inclosing a spacing ring 22 of such diameter that the projection of the plates beyond the ring constitute the groove for the reception of the block 12 or 14 as the case may be.

Adjacent to each disk 6 there is a roller 23 mounted on the shaft 4 and capable of rotating independently of said shaft but incapable of moving longitudinally thereof. This roller or drum 23 has inset in the face adjacent to the disk 6 a plate 24 with a circular series of holes or perforations 25 which may be entered by the pins 19. Each roller or drum 23 may be constructed of wood or other such material and the plate 24 which may be of metal then becomes a wearing plate protecting the wooden roller from the action of the pins 19 and in order to permit the passage of the pins 19 through the perforations 25 the roller 23 may be bored out in line with the perforations 25. The other face of each roller or drum 23 remote from that adjacent to a disk 6 is counter-bored as indicated at 26 and within this counter-bore there is housed a ratchet wheel 27 fast on the shaft 4. This wheel is under the control of a spring pawl 28 which will permit the drum or roller 23 to which the pawl is secured, to move in either direction with relation to the ratchet wheel 27 if sufficient force be applied, but constraining the movement of the drum or roller 23 with the ratchet wheel in the absence of a superior force resisting such movement.

Applied to the face of each drum or roller 23 having the chamber or counter-bore 26 is an annular ratchet wheel 29 approaching in diameter the diameter of the drum or roller 26. This ratchet wheel 29 is made fast to the roller and a central plate 30 is held to the drum or roller 23 by the ratchet wheel and in turn confines the ratchet disk 27 in the chamber or counter-bore 26.

On the shaft 5 adjacent to each disk 7 is a drum or roller 31 which may be of wood or like material and is provided with a wearing plate 32 having diametrically located perforations 33 for the pins 19 carried by the disks 7. The drums or rollers 31 are rotatable on the shaft 5 but do not move longitudinally thereon. The cover 2 adjacent to each drum 31 is provided with an opening 34 and extending across the casing immediately below the openings 34 is a bar 35 having convex bosses 36 thereon extending into the openings 34. Wound upon each drum 31 is a band or tape 37 and this band is passed from the drum 31 over the corresponding boss 36 thence again upon the drum and finally therefrom around a guide plate 38 which may be carried by the bar 8 and thence to and around the corresponding drum 23 carried by the shaft 4, each drum 23 on the shaft 4 having its counter-part in a drum 31 on the shaft 5.

It will be observed that the levers 10 are pivoted between the shafts 4 and 5 and consequently when the accessible end 15 of a lever 10 is moved in the proper direction a disk 6 will be brought into operative relation to a drum 23 as the corresponding disk 7 is moved away from the adjacent drum 31 on the shaft 5. The purpose of the disks 6 and 7 is to couple the corresponding drum 23 or 31 to the respective shaft 4 or 5 so that when the shaft 4 is turned by means of an accessible crank 39 or the shaft 5 by an accessible crank 40, the drum 23 or 31 as the case may be will be coupled to the corresponding shaft and will be caused to rotate therewith when the shaft is actuated by means of the crank 39 or 40 as the case may be.

In order to prevent the shaft 4 from turning in one direction there is provided a ratchet 41 and pawl 42 and a like ratchet 43 and pawl 44 are provided for the shaft 5.

Each disk 30 is free to rotate with respect to the shaft 4 and the drum 23 but is held to the drum against movement away therefrom by the ratchet wheel 29 before referred to. Each disk 30 carries a handle or arm 45 projecting radially across the face of the corresponding ratchet wheel 29 and each handle or arm 45 carries a pawl 46 in operative relation to the teeth of a ratchet wheel 29. The handle 45 is also provided with a laterally projecting pin 47, closely over-riding the teeth of the ratchet wheel 29 for a purpose which will presently appear.

The cover 2 is rounded out over the several drums 23 and is provided with slots 48 for the passage of the handles 45 which project beyond the outer face of the cover so as to be accessible to an operator for a purpose which will presently appear.

Carried by the cover 2 adjacent to the inner face thereof and at each end of the curved portion inclosing the drums 23 are rods 49 carrying rollers 50 and 51 respectively, each roller 50 on the rod 49 having its counter-part in a roller 51 on the other rod 49. Adjacent to each roller 50 the cover 2 is provided with a passage 52 and adjacent to each roller 51 the cover is provided with a passage 53. Extending from a roller 50 to its companion roller 51 is a tape or band 54 exterior to the curved portion of the cover through which the handles or arms 45 project, the ends of the bands being wound upon the respective rollers 50 and 51. Each arm or handle 45 carries a pointer 55 in operative relation to a corresponding band 54.

For purposes which will presently appear it is desirable to lift the cover 2 away from the main portion of the casing about its hinges and for this purpose the cover may be provided at the end remote from the hinges with a lift handle 56 and a spring latch 57 so that the cover will be held normally closed but may be readily released from engagement with the body portion of the casing for movement about its hinges.

Each ratchet wheel 29 is provided with an elastic back stop pawl 58 carried by the bar 8 and each pawl has at its free end a projecting nose 59 in the path of the pin 47 of the corresponding arm or handle 45 so that when this arm or handle is moved in the proper direction and to a sufficient extent the pin 47 will under-ride the nose 59 and lift the pawl from engagement with the teeth of the corresponding ratchet 29.

The shaft 4 extends through the partition 3 and there carries a crown gear wheel 60 normally engaged by a pinion 61 fast on a short shaft 62 journaled in bearings formed on the end of the arms of a yoke 63 on one end of a lever 64, this lever being pivoted to an appropriate partition 65 within the compartment defined by the partition 3 and the corresponding side of the casing. The end of the lever 64 remote from the yoke 63 is connected to a rod or bar 66 extending through one end of the casing and there provided with a manipulating handle 67, the said handle and shoulders 68 formed on the bar limiting the extent of movement of the bar, the handle 67 and shoulders 68 engaging the walls of the casing adjacent to the passage way provided for the bar 67.

Mounted on the end of the shaft 62 remote from the gear wheel 61 is a wheel 69 on the periphery of which is a series of appropriate numbers visible through a passage way 70 in the adjacent portion of the cover 2. The wheel 69 is also provided near its periphery with a laterally projecting pin 71.

Adjacent to the wheel 69 is a drum 72 mounted on a short shaft 73 extending through the adjacent side of the casing 1 and there provided with a manipulating knob or milled head 74. The drum 72 is provided with a hub 75 projecting on one side and this hub is engaged by one end of a spring 76, the other end of which spring is made fast to the casing. The purpose of the spring is to provide a resistance to the turning drum 72 so that it may be moved by the exertion of an appropriate force sufficient to overcome the friction on the spring. Around the periphery of the drum 72 at one side thereof is a circular series of equidistantly spaced pins or projections 77 in the path of the pin 71, the arrangement being such that at each rotation of the wheel 69 the pin 71 will engage a pin or projection 77 of the drum 72 and turn the latter a space equal to the distance between two pins or projections 77.

Mounted in the end of the casing remote therefrom but in line with the drum 72 is another drum 78 on a short shaft 79 projecting through the adjacent side of the casing 1 and outside the casing provided with a knob or milled head 80. At a point above but adjacent to the drum 72 the top or cover 2 of the casing is provided with an aperture 81 and immediately beneath this aperture is a roller 82. The drum 78 carries a tape or band 83 which is continued from the drum 78 over and around the roller 82 and thence around and under the drum 72, the ends of the band being secured to the respective drums 78 and 72.

The numbers on the wheels 69 are in consecutive order from 1 to 100 and spaced to occupy the entire circumference of the wheel 69. The band 83 has thereon consecutive numbers by hundreds and the proportions of the parts are such that one rotation of the wheel 69 will display at the openings 70 progressively the numbers thereon from 1 to 100 and on starting on a second rotation the pin 71 of the wheel 69 will be brought into engagement with a pin or projection 77 of the drum 72 and rotate the latter sufficiently to wind the band or tape 83 on said drum 72 to an extent to cause the display of the number 100 at the aperture 81. When the wheel 59 has made a second rotation then the drum 72 is actuated another space and causes the display of the number 200 at the aperture 81 and this may be continued within the limits of the length of the tape or band 83.

The tapes or bands 37 visible through the openings 34 have displayed thereon in a longitudinal series groups of figures representing the number of bunches of lumber and also the number of feet both by face count and strip count. For example one band may contain the figures designating the number of bunches and the feet of material therein by both kinds of count for lumber in ten foot lengths, another band for lumber in 12 foot lengths, and so on. Again the band containing the figures for lumber of a certain length may be sufficiently extensive to be divided into successive zones differentiated by color or otherwise, one zone containing the numbers of bunches and the numbers of feet therein for a certain width, then the next zone for another width and so on throughout the length of the tape or band, and this same arrangement may be present in all the bands 37.

Figure 1:
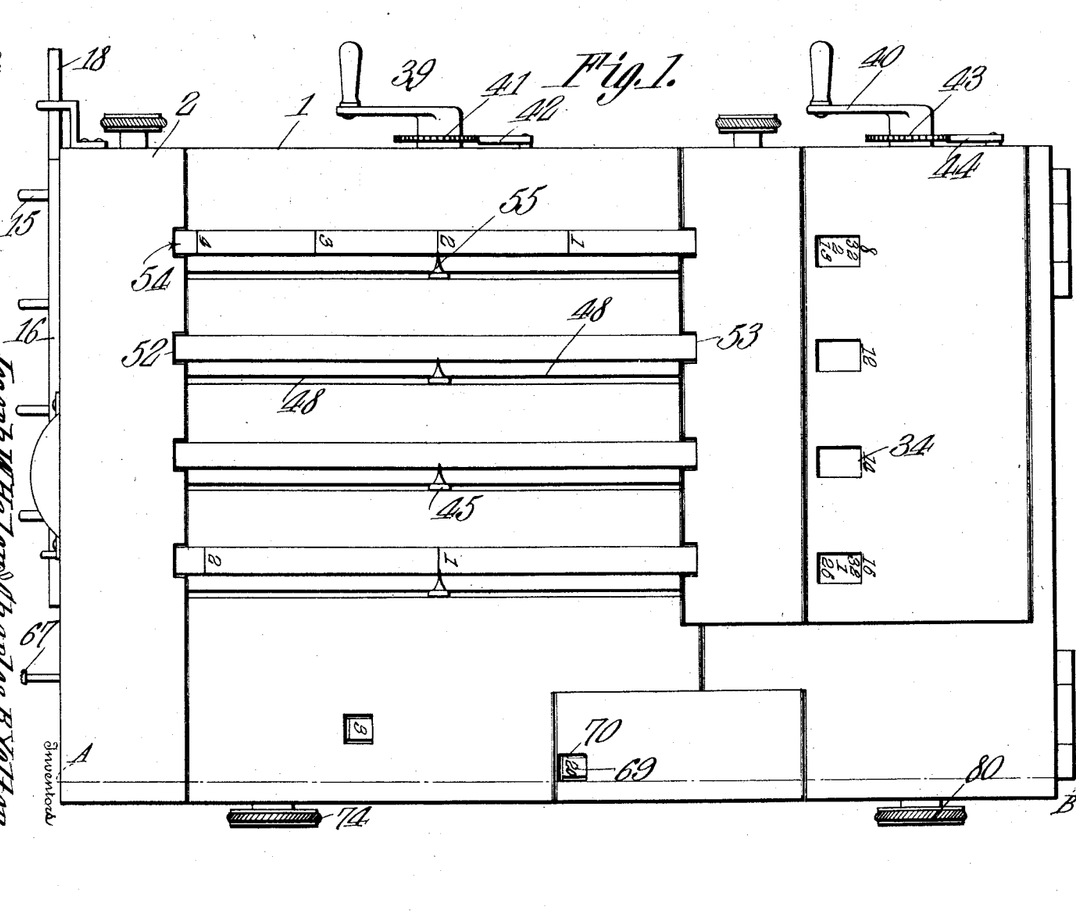
Figure 1 is a top plan view of a machine constructed in accordance with the present invention.
Figure 2:
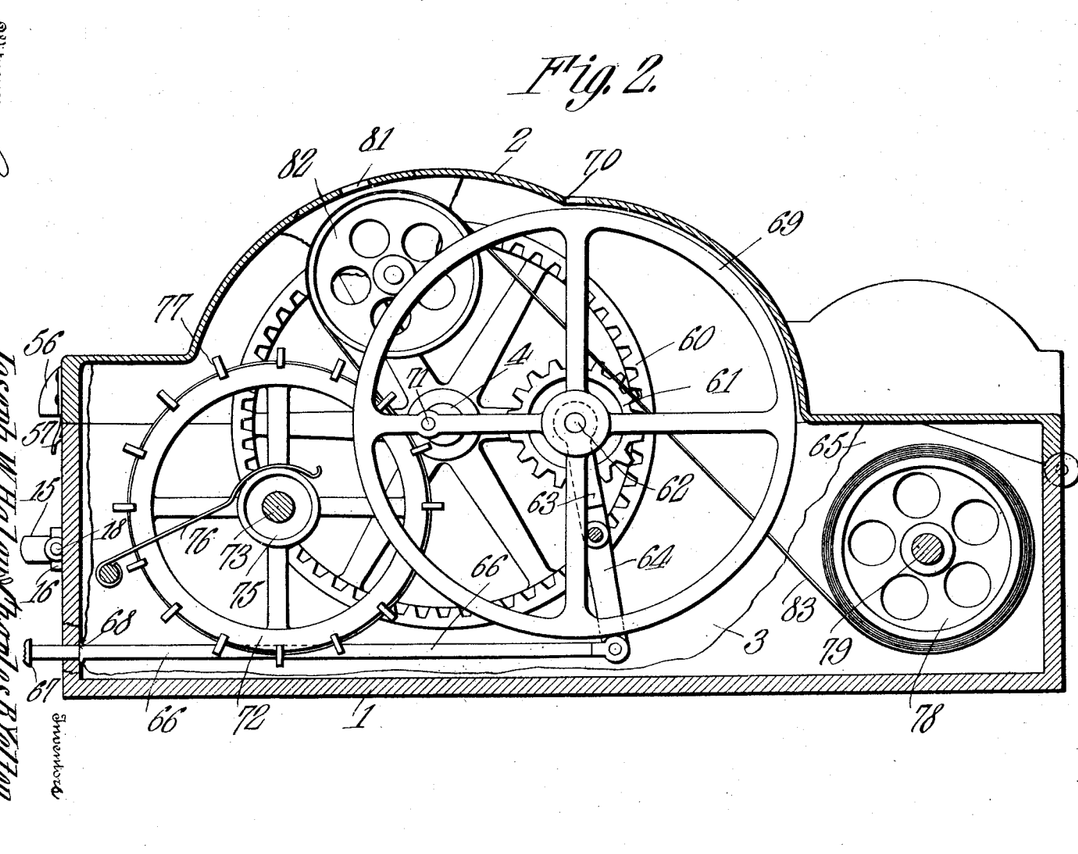
Fig. 2 is a section on the line A—B of Fig. 1.
Figure 3:
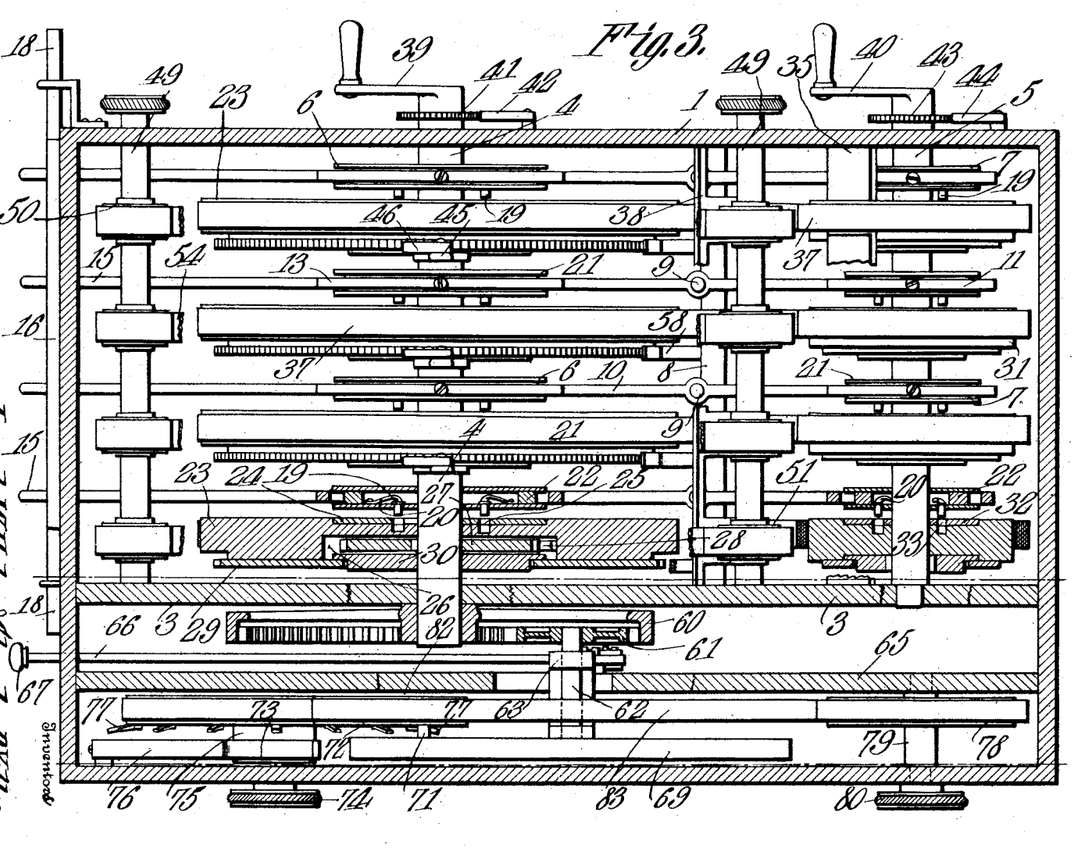
Fig. 3 is a plan view with the top of the casing removed and some of the parts shown in section.
Figure 4:
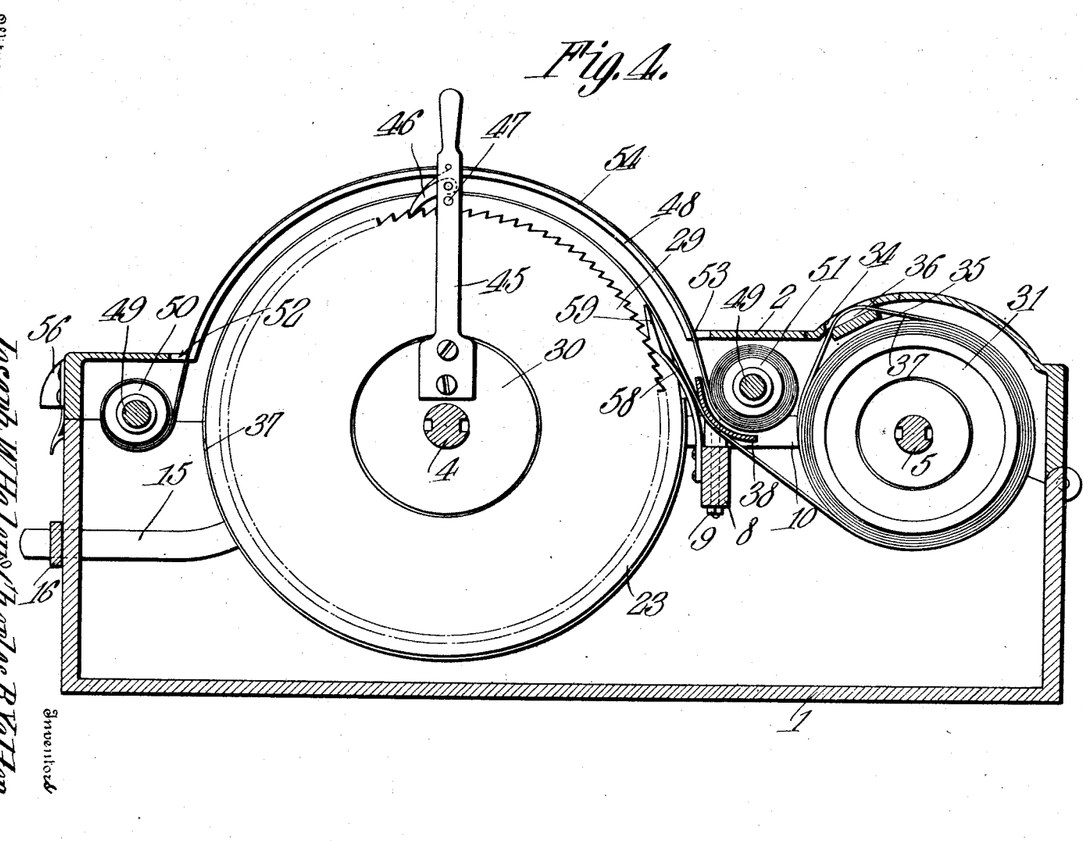
Fig. 4 is a vertical longitudinal section adjacent to any one of the operating levers.

The tapes or bands 54 contain series of figures in consecutive order and properly spaced to represent numbers of bunches or bundles of lumber, and the spacing between these figures on a single band will agree with the width of the lumber where the length remains the same, the spacing on the corresponding bands 37 being likewise proportioned to the width of the lumber designated. Now, assuming that the parts are all properly proportioned, let it be further assumed that a customer desires three bunches of flooring in 20 foot lengths, such bunches being usually six pieces to a bunch, and four bunches of ten foot lengths. The operator adjusts the tapes or bands 54 and the bands 37 representing 10 and 20 foot lengths for the proper width of the flooring. The arms or handles 45 are all assumed to be in a position at the extreme right of their movement as viewed in the drawings, such positions being zero positions, instead of being in the particular position illustrated in Figs. 1, 3 and 4. Now the handle 45 for the 20 foot length is moved along the adjacent band or tape 54 until the pointer 55 is opposite the numeral representing three bunches and which would be designated on the tape by the numeral 3. This will cause the winding of the tape 37 upon the drum 23 and the unwinding thereof from the drum 31 until there is displayed at the opening 34 three numbers. One of these numbers in the particular instance considered will be 97 which represents 97 feet face count. Another of these numbers will be 120 which represents 120 feet strip count while an intermediate number will be the number 3 representing 3 bunches. Before the handle or arm 45 is moved actively in the manner described the corresponding lever 10 has been moved in a direction to couple the particular drum 23 under consideration to the shaft 4 through the appropriate disk 6, the drum 31 corresponding to the drum 23 under consideration then being uncoupled from the shaft 5. When the arm or handle 45 is moved actively then the pawl 46 engages a tooth of the ratchet wheel 29 and this wheel being fast to the drum 23 the latter is caused to rotate and the shaft 4 participates in this rotation. The particular drum 23 carrying the band or tape corresponding to the ten foot lengths is first coupled to the shaft 4 by an appropriate movement of the corresponding lever 10 and then the arm or handle 45 for actuating the second drum 23 carrying the tape corresponding to the ten foot lengths is actuated four spaces on the tape 54 corresponding thereto. This will cause an appropriate movement of the tape or band 37 connected to the second drum under consideration, and this will display at the corresponding opening 34 three numbers which under the particular illustration being considered will represent 80 feet strip count, 65 feet face count, and an intermediate number 4 to represent the four bunches. Since it is desirable to ascertain the total quantity in three bunches of 20 feet lengths and four bunches of ten foot lengths, the bar 66 is manipulated to bring the pinion 61 into mesh with the gear wheel 60. When the first handle or arm 45 was moved as described, a rotative movement was imparted to the gear wheel 60 since this gear wheel is keyed fast to the shaft 4. This will in turn impart a rotative movement to the wheel 69 which, since its periphery has figure indications representing but 100 feet in the particular example taken, will rotate more than a single time since the total amount in the three bunches of 20 foot length is 120 feet so the wheel 69 will cause a movement of the drum 72 the distance of a space between the pins 77 so as to display at the aperture 81 the number 100 on the tape or band 83 while at the aperture 70 the number 20 will appear on the periphery of the wheel 69. The movement of the second arm or handle 45 representing 80 feet will cause a further rotation of the shaft 4 and an additional movement of the wheel 69 for a distance representing 80 feet thus bringing the zero designation at the aperture 70 and the 200 designation at the aperture 81 so that the total amount of feet in three bundles of 20 feet length and four bundles of 10 feet length will be shown to be 200 feet while the individual amounts of these two groups will be shown at the appropriate aperture 34.

If it be desired to ascertain how many bundles of different lengths of lumber may be necessary to make up a specified total then the arms or handles 45 for one or more lengths of lumber may be manipulated in the proper direction until the total appears at the apertures 70 and 81 and then the number of bundles required may be read through the appropriate apertures 34. In like manner the total of any desired amount of lumber of various lengths whether face or strip count may be ascertained without calculation and the number of lengths whether the pieces be of the same or different lengths, may be readily ascertained to make up a specified total. To re-set the device all the handles 45 which have been manipulated are returned to the zero position where the pins 47 will engage under the noses 59 and so lift the pawls 46 and 58 out of the path of the teeth of the ratchet wheels 29. The levers 10 which were first operated to couple up certain or all of the drums 23 to the shaft 4 are now moved to uncouple these drums 23 from the shaft 4 and to couple the corresponding drums 31 to the shaft 5. If all the drums 23 have been moved in ascertaining the amount of lumber needed, then the slide 16 may be manipulated thus moving all the levers 10 simultaneously and causing the coupling of all the drums 31 to the shaft 5. Now the crank 40 is turned in the appropriate direction, the pawl 44 and ratchet 43 permitting this movement and the bands or strips 37 are all rewound on the drums 31 to the zero position, the drums 31 being uncoupled from the shaft 5 as necessary by a proper manipulation of the levers 10. Those drums 31 which have not been moved in the first operation need not be coupled to the shaft 5 and the arms 45 need not be in their initial position ready for action quite so far toward the right as viewed in the figures as to lift the back stop pawl 58 from engagement with the teeth of the ratchet wheels 29 so that any friction which may exist between the shaft 5 and the drums 31 will not cause the movement of the tapes or bands 37 of the inactive drums. If it be desired to display at the openings 34 some other zone of the band 37 than the one previously revealed then the particular drum or drums 23 may be coupled to the shaft 4 for rotation therewith while the bar 66 is moved in a direction to carry the pinion 61 out of mesh with the gear wheel 60 and then by turning the crank 39 in the proper direction, which direction is permitted by the ratchet 41 and pawl 40 the tape desired may be wound upon the drums 23 to the requisite extent, and the device is then ready for manipulation in the manner already described. By lifting the cover 2 about its hinges the rollers 50 and 51 carrying the tapes or bands 54 are readily accessible since these rollers and the tapes or bands 54 are lifted with the cover and then these tapes or bands may be shifted as desired. By a proper manipulation of the rod 66 the wheel 69 is readily uncoupled from the gear wheel 60 and then by a suitable manipulation of the milled head 80 or both milled heads 80 and 74 the band 83 may be returned to its initial position and the wheel 69 may be also turned to the zero position either by raising the top of the casing or by providing an aperture in the side of the casing adjacent to the wheel 69 so that it may be readily returned to the zero position, or this wheel may be made accessible through the aperture 70 so as to be readily returned to the zero position.

It will be understood that the invention is not confined in any manner to the specific arrangements and proportions of the parts as illustrated but that the invention in respect to its specific embodiment may be varied in many respects from the showing of the drawing without in any manner departing from the principles of the invention.

What is claimed is:—

1. In a register for lumber measurement, spaced revoluble elements, a tape secured thereto and adapted to be wound thereon, said tape carrying designating characters, separate means for rotating either of said elements to wind the tape thereon, pawl and ratchet mechanism for rotating one of said elements to wind the tape thereon, said mechanism including a handle, and a longitudinally adjustable band adjacent the path of the handle and having data thereon for determining the length of movement of the handle.

2. A register for lumber measurement, including a handle mounted for oscillation, a band supported adjacent the path of the handle and having graduations for determining the length of movement of the handle, winding means connected to each end of the band for shifting said band longitudinally in either direction, pawl and ratchet mechanism actuated by the handle, a tape, and means actuated by said mechanism for shifting the tape longitudinally, said tape carrying data readable in connection with that data on the band designated by the handle.

3. A register for lumber measurement including a casing having an aperture and a slot, a handle mounted for swinging movement within the slot, a band supported adjacent the slot and having designated graduations, means connected to the ends of the band for shifting said band longitudinally in either direction relative to the slotted portion of the casing, pawl and ratchet mechanism actuated by the handle when moved in one direction, a tape, and means operated by said mechanism for shifting the tape longitudinally to expose data within the opening in the casing, said data being readable in connection with the designated graduation indicated by the handle.

4. A register for lumber measurement, including a casing having an opening, an operating element mounted for swinging movement, a longitudinally shiftable graduated device adjacent said element, a ratchet wheel, means operated by said element when moved in one direction, for rotating the ratchet wheel, a tape having a portion visible through the opening, means operated by the ratchet wheel for shifting the tape longitudinally to expose within the opening graduations on the tape which are readable with the graduations on the longitudinally shiftable device and which are indicated by the actuating element, means for holding the ratchet wheel against movement in a direction opposite to that in which it is shifted by the actuating element, and means on said element for releasing the ratchet wheel from said holding means.

5. A register for lumber measurement, including spaced drums, a clutch device adjacent each drum, a lever pivotally engaging said clutch devices and fulcrumed between them, separate winding means for rotating the respective clutch devices, a tape secured at its ends to the drums, and means for shifting the lever to place either of the clutch devices in engagement with the adjacent drum.

6. A register for lumber measurement, including spaced drums, a tape secured at its ends to, and adapted to be wound on the drum, means for shifting said tape longitudinally, a longitudinally adjustable graduated band having designating data thereon readable in connection with said means, for controlling the length of movement of the means, total indicating means, means for transmitting motion from said tape shifting means to the total indicating means, and means under the control of an operator for preventing transmission of motion to the total indicating means.

7. A register for measuring lumber, including an actuating handle mounted for swinging movement, a casing having an aperture, spaced drums, a tape secured at its ends to, and adapted to be wound upon the drums, pawl and ratchet mechanism operated by the handle for rotating one of the drums to shift the tape longitudinally and display data on the tape within the opening, a longitudinally shiftable graduated band adjacent the path of the handle, said graduations constituting means for determining the length of movement of the handle, and the designated graduations being readable with the data disclosed in the aperture, and total indicating mechanism operated by the actuated drum, said mechanism including a wheel having numerals upon its periphery adapted to be successively exposed within an opening in the casing, a tape, drums to which the ends of the tape are secured, and coöperating means upon said wheel and one of the drums for imparting an intermittent movement to the tape, said tape having data thereon coöperating with the data on the wheel, to indicate the total.

8. In a register for lumber measurement, a series of drums, a shaft supporting the same, another series of drums with the individual drums in alinement with like drums of the other series, a shaft supporting the second series of drums, index tapes or bands extending between the drums and each carrying indices for both strip and face count measurement, means for rotating either shaft separately, clutches between each shaft and the respective individual drums, and means for moving the clutches of like drums in opposite directions with respect to related drums of the two series.

In testimony that we claim the foregoing as our own, we have hereto affixed our signatures in the presence of two witnesses.

JOSEPH W. HALEY.
CHAS. B. YELTON.

Witnesses:
JEFF. D. STEPHENS,
OSCAR HUEY.